United States Patent [19]
Nicolas et al.
[11] 3,837,500
[45] Sept. 24, 1974

[54] DIAPHRAGM FOR INVERSE OSMOSIS AND METHOD OF MAKING SAME

[75] Inventors: Louis Nicolas, Paris; Richard Dick, Vert-le-Petit, both of France

[73] Assignee: Anvar-Agence Nationale de Valorisation, Paris, France

[22] Filed: Apr. 16, 1971

[21] Appl. No.: 134,815

[30] Foreign Application Priority Data

Apr. 17, 1970 France .......................... 70.13941

[52] U.S. Cl. .................... 210/490, 210/500, 264/49
[51] Int. Cl. ........................................ B01d 31/00
[58] Field of Search ........ 264/41, 49; 210/492, 500, 210/23, 321

[56] References Cited

UNITED STATES PATENTS

| | | | |
|---|---|---|---|
| 3,276,996 | 10/1966 | Lazare | 210/500 X |
| 3,615,024 | 10/1971 | Michaels | 210/500 X |
| 3,661,634 | 5/1972 | Riley et al. | 210/500 X |

OTHER PUBLICATIONS

Michaels, "Ultrafiltration," from Progress in Separation and Purification, Vol. 1, E. S. Perry, Editor, Interscience, New York, (1968), pages 4–13, relied on.

*Primary Examiner*—Frank A. Spear, Jr.
*Attorney, Agent, or Firm*—Craig & Antonelli

[57] ABSTRACT

The invention relates to a method of preparation of semi-permeable diaphragms, especially for use in inverse osmosis and enabling substantially pure water to be extracted from aqueous solutions of dissolved substances of low molecular weight, such as sodium chloride, saccharose, etc. The diaphragms for inverse osmosis essentially consist of a film-producing polymer having a sufficient number of mobile hydrogen groups to give, after reticulation, compounds which are insoluble in water. The method covers the preparation of ultra-thin layers which can be employed for hyperfiltration purposes, and also includes the superficial reticulation of a dry film of polymers which include, inter alia, the polyvinyl alcohols and polyvinyl pyrrolidone. The reticulation agent is preferably chosen from the di-isocyanates and may comprise a solvent for a swelling agent for the polymer and a catalyst for the reticulation reaction. An important feature of the invention is that the degree of reticulation of such diaphragms varies progressively throughout the thickness of the film, the most highly reticulated layer being a very thin superficial layer of the diaphragm.

35 Claims, 1 Drawing Figure

2
1
3
4
5

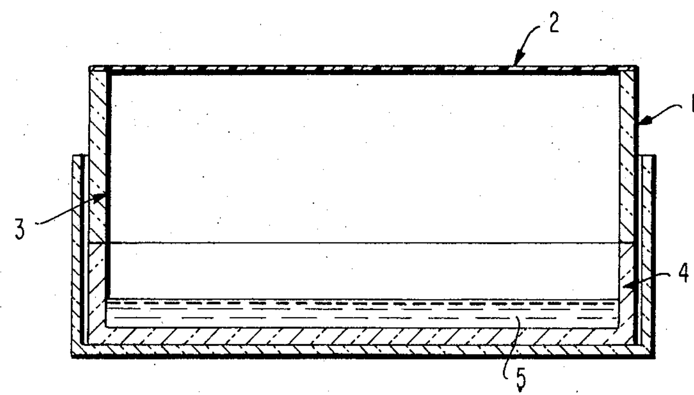
INVENTORS
LOUIS NICOLAS
RICHARD DICK
BY Craig, Antonelli & Hill
ATTORNEYS

DIAPHRAGM FOR INVERSE OSMOSIS AND METHOD OF MAKING SAME

The present invention, developed in the laboratories of the National Institute of Applied Chemical Research (N.I.A.C.R.) relates to a method of preparation of semi-permeable diaphragms, the use of which in reverse osmosis enables practically pure water to be extracted from aqueous solutions of dissolved substances of low molecular weight, such as sodium chloride, saccharose, etc.

The semi-permeable diaphragms which are in commercial use at the present time are diaphragms of cellulose acetate prepared according to the method of Loeb and Sourirajan (U.S. Pat. Nos. 3,133,132 and 3,133,137) or following a similar method. These diaphragms have good performances in respect to their flow-rate of water and their rejection of NaCl, but have a limited duration of life. This limitation would appear to be essentially due to hydrolysis of the cellulose acetate and is shown by a reduction of the rejection rate of salt during the course of time.

The present invention has for its object to produce a diaphragm for inverse osmosis consisting of a film-producing polymer having a sufficient number of mobile hydrogen groups so as to give, after reticulation, compounds which are insoluble in water.

It also relates to a method of preparation of ultra-thin layers which can be used for hyper-filtration and which are most flexible and more general in use than the Loeb method. This latter, which is based on the production of a definite texture of diaphragm by controlled evaporation of a mixture of suitably chosen solvents, has up to the present time only been used with success in the case of certain acetates of poly-saccharides.

Another object of the invention is to produce diaphragms having performances equivalent to those of the Loeb diaphragms having in particular a rejection coefficient for sea salt of 98 to 99 percent, with a flow rate of water up to 400 litres per sq. m. and per day at 100 bars pressure for a 3.5 percent solution of NaCl in water.

The diaphragms which form the object of the present invention offer, as compared with those of Loeb, various advantages arising from the three following characteristics:

1. The use of various polymers or prepolymers alone or in mixtures, which do not lend themselves to the use of the Loeb process. This gives the possibility of:
   *a.* varying the chemical composition of the filtering layer so as to adapt it in the best possible manner to selective filtration;
   *b.* extending the duration of life of the diaphragm by improvement of the chemical stability (cellulose acetate becomes slowly hydrolized in inverse osmosis);
   *c.* improving resistance to micro organisms.
2. The separate construction of the filtering layer which can be deposited on any kind of porous or permeable support. By a suitable choice of this latter, it thus becomes possible to obtain greater mechanical stability and better resistance to the phenomenon of progressive compacting of this support under the action of pressure, together with improved resistance to possible chemical and microbic attacks.

The production in the dry state of the essential part of the final structure of the filtering layer, which, even after a finishing treatment in an aqueous medium intended to close-up this structure, enables this layer to be dried and soaked with water a number of times without any special precautions and without affecting its qualities. This results in the property of dry conservation of new diaphragms which differentiate them advantageously form Loeb diaphragms (unless the latter have been treated by lyophilization, they are preserved in water and slowly deteriorate).

Another method, not commercial but nevertheless described, of obtaining diaphragms for inverse osmosis, consists of preparing by evaporation ultra thin films having a thickness of the order of 0.1 $\mu$ of various polymers insoluble in water or rendered insoluble by reticulation in the homogeneous phase during the course of evaporation. As compared with diaphragms obtained in this manner, those forming the object of the present invention have two advantages:

A greater facility of use of water-soluble polymers, that is to say of hydrophilous polymers providing diaphragms very permeable to water, which are in principle the most advantageous. It is much easier to reticulate the surface of a previously constituted film by subsequent exposure to the reactant than to obtain a release, retarded up to the end of the formation of the film, of the action of the reticulating agent previously incorporated in the film-producing solution;

a greater facility of handling and greater strength of the filtration layers. As distinct from the ultra-thin layers referred to above, which have a substantially homogeneous composition throughout their whole thickness, the very thin reticulated layers obtained by the present invention have from one face to the other a very marked gradient of the degree of reticulation of their constituents and therefore of the density of their structure. The result is that their permeability to water and their arresting power with respect to solution constituents are determined by a fraction only of their thickness. This does not therefore need to be so small (more than 0.5 $\mu$ in general), without however exceeding about 10 microns. Even isolated by solution of the non-reticulated polymer, these layers are thus more easily handled. In addition, the present invention makes it possible to carry out the solution of the non-reticulated polymer only after fixation of the layer on the selected porous support, which obviates any difficulties of handling.

A further characteristic feature of the present invention consists of employing for the manufacture of semi-permeable diaphragms, utilizable by inverse osmosis in aqueous solutions of polymers soluble in water and therefore highly hydrophilous and being capable for this reason of supplying (even after the necessary chemical modifications) diaphragms having a high permeability to water.

Amongst these polymers, there may be cited by way of example and without the list being limitative, the polyvinyl alcohols (which are in reality polymers of vinyl alcohol and vinyl acetate), polyoxy-ethylene glycol, the polyethylene imines, polyvinyl-pyrrolidone, etc.

A further characteristic of the invention consists of superficially reticulating a dry film of the above polymer. This reticulation is obtained by putting one face of the film into contact with a solution of the reticulating agent in a dry atmosphere, or with the vapour given off by such a solution. This latter may advantageously contain a solvent or a swelling agent for the polymer and, if so required, a catalyst of the reticulation reaction.

The reticulation agent will be chosen from those having high speeds of reaction which give satisfactory results. Amongst these there may be cited for example the di-isocyanates. The function of the swelling agent or solvent is to permit the controlled penetration of the reactant into a certain thickness of the film for the duration of application of the temperature selected. The function of the catalyst, which accelerates the speed of reaction with respect to the speed of diffusion, is to facilitate the production of a closer structure in the immediate vicinity of the surface of the film.

The composition of the solution, which may vary within wide limits, the duration and the reaction temperature determine the thickness of the reticulated layer.

Another characteristic feature of the method of the invention consists, after the action of the reticulating agent, of dissolving the non-reticulated portion of the film obtained in water or another solvent, this dissolving action being advantageously carried out at a temperature not exceeding 30°C. In this way, extremely thin diaphragms can be produced.

According to a further feature of the invention, the film, treated by superficial reticulation, is previously subjected to conditions of preparation intended to permit the control of its accessibility to the reactant.

This depends on the physical state of the film, especially on its crystallinity, on the proportion of plastifying agent contained in the film and on the number of intermolecular bonds which are formed during the course of the preparation of the film (hydrogen bonds, thermal reticulation). As furthermore the initial structure of the film (degree of homogeneity, distribution of the density as a function of the thickness, more or less orderly structure) is not modified in any considerable way by the reticulation, that of the reticulated layer mainly depends on the method of preparation of the film, especially on the nature of the solvent employed, on the speed of evaporation of the solvent and on the conditions of drying (temperature, degree of vacuum, chemical dryer).

Two extreme cases may arise, depending on the conditions of evaporation of the solvent and the drying of the film.:

A slow evaporation of the solvent makes it possible to obtain a film having a homogeneous structure over a large part of its thickness. This homogeneity is not affected by gentle drying in the vicinity of ambient temperature in the presence of a drying agent which can absorb the solvent, or under a partial vacuum. A film prepared under these conditions is easily penetrated by the vapours of the reactants. The addition of a plastifying agent also facilitates the penetration of the vapours of the reactants. The reticulated layer obtained after exposure of the film to the reactant vapours also possesses a homogeneous structure and shows only a small dissymetry between its two faces;

A rapid evaporation of the solvent results in an asymmetrical film, the structure of which is dense close to the face which remains in air during evaporation, and less dense or porous in the vicinity of the face which remained in contact with the support during evaporation. Vigorous drying at a sufficiently high temperature still further increases the dissymmetry of structure between the superficial layer and the interior of the film, especially if the polymer utilized for the preparation of the film is semi-crystalline or has a tendency to exchange intermolecular bonds under the effect of heat. By exposing the dense face to the vapours of the reactants, there is obtained an asymmetrical reticulated layer, one of the faces of which is very hydrophilous while the other is only slightly so. The slightly hydrophilous face corresponds to the face of the film exposed to the reactant vapours and the very hydrophilous face corresponds to a region having a less dense structure, located in the interior of the film.

As the production of a highly asymmetrical reticulated layer is generally advantageous in order to obtain high performances of permeability and selectivity, the second method of preparation will be that which is preferably adopted.

In a particular case (reticulation of polyvinylpyrrolidone) the film will be conditioned in such manner as to retain the rate of humidity (2 to 3 percent necessary for effecting the reticulation reaction.

Another characteristic feature of the invention is that the distribution of the molecular masses of the film-producing polymer is chosen independence on the characteristics which it is desired to give to the filtration diaphragm. Under identical conditions of reticulation, the presence of low molecular weights facilitates the formation of a thick reticulated layer, while that of high molecular weights facilitates the formation of a thin and asymmetrical reticulated layer. In order to obtain high performances, there will advantageously be chosen a polymer having a high proportion of high molecular weights. In practice, use will be made of commercial polymers, in which the aqueous 4 percent solution has a viscosity at 20°C of 50 to 150 centipoises, these polymers giving generally satisfactory results.

In another characteristic feature of the invention, the film treated by superficial reticulation is advantageously subjected to a thermal treatment in hot water at temperatures comprised between 30° and 100°C., and preferably between 60° and 100°C. This treatment simultaneously results in a favourable closure of the structure of the reticulated layer, dissolving of the non-reticulated polymer and extraction of the swelling agents or residual solvents.

According to another feature of the invention, the thin reticulated layer thus obtained may be deposited on any kind of porous support. This support is advantageously constituted by any porous layer of a polymer which is wettable by water, having a thickness comprised between a few centimeters and a few tenths of a millimeter. Generally speaking, all the porous ultrafiltration diaphragms at present in commercial use can be utilized as supports. These diaphragms may be for example composed of cellulose acetate, vinyl polychloride, nylon or any other polymer wettable by water. The diameter of the pores of these supports is advantageously comprised between 0.01 and 1 micron.

In addition, in order to obtain good strength, a microporous support is necessary in which the pore diameter at the surface is at least ten times smaller than the thickness of the filtration layer in order to prevent this filtering layer from passing into the pores.

According to a further characteristic feature of the invention, the permeability to water of the thin reticulated layer is substantially increased after conditioning the reticulated film at the surface in water at ambient temperature. This conditioning is carried out before the thermal treatment of the film in hot water.

In order to obtain the best performances and to maintain these continuously during the utilization of the diaphragm, this deposit will advantageously be effected in such manner that the face in contact with the supports is that which has the closest structure, that is to say is the face put into direct contact with the reticulating agent during the superficial reticulation treatment.

Purely by way of illustration, and without giving rise to any possibility of a restrictive interpretation of the method, there is given below an example of the method of operation during a reticulation treatment in the vapour phase, reference being made to the accompanying drawing which shows a device for carrying the method into effect.

a. Exposure of the Film

A hollow support 1 of glass or metal is covered with the film 2 to be treated. There is thus produced a tank 3, the bottom of which is formed by the film. This tank serves as a cover for another tank 4 which contains the reactants 5. The two tanks are designed so as to fit hermetically one on the other, as shown in the FIGURE.

The film and its support are previously dried before being fixed on the tank containing the reactants. This latter operation is preferably carried out in a glove box. The assembly formed by the two tanks fixed one on the other is placed in a dessicator containing a drying agent. This desiccator is heated for several hours in a stove, the temperature of which is kept constant.

An alternative form of this method consists of pouring the film over a form or a mould of glass or metal having the shape which it is desired to give to the diaphragm, a plate for example if it is desired to produce a flat diaphragm, a cylinder if the diaphragm is to be cylindrical, etc., and of exposing this form or mould, coated with the film, to the vapour of the reactants. As previously, it is desirable that the film should be previously dried and that the treatment should be carried out in a closed chamber protected against humidity.

b. Rinsing and Drying the Film

After having been exposed to the vapours of the reactants, the film is rinsed in a solvent of the reactants and then dried at a controlled temperature for one of several hours. It is advisable to carry out this rinsing under protection against humidity.

The film thus treated is utilized either directly or preferably after having been subjected to a thermal treatment in hot water. The temperature and the duration of the thermal treatment are a function of the initial thickness of the film and of the chemical nature of the polymer.

The following examples illustrate the basic characteristics of the method of preparation of diaphragms in the vapour phase.

The flow-rate measurements in inverse osmosis given in these examples were taken with an apparatus constructed according to the model described by SOURIRAJAN (Ind. Ing. Chem. Proc. Design and Development Fundamentals 3,206, 1964).

The pump employed to circulate the brine under a pressure of 100 bars above the diaphragm delivers 13.8 litres per hour. For reasons of operational safety of the equipment, the circulation of the brine was stopped during the night and at the week-end, so that the results are lower than those which are obtained with a continuous circulation of the brine.

The useful surface of the diaphragm is 7.5 sq. cm. and the thickness of the layer of brine above the diaphragm is 2.8 cm.

EXAMPLE 1

A film of polyvinyl alcohol of 6 microns in thickness (dry film) was prepared from a 5 percent aqueous solution by weight of Elvenol 73–125 (polyvinyl alcohol containing at least 1 percent of polyvinyl acetate, manufactured by Du Pont) by pouring the solution over a plate of nickel-plated brass, and by evaporation of the water in a stove with a partial vacuum, brought up to 60°C. The film, previously stretched on a glass support and dried at 60°C. for one hour was exposed for 14 hours by its "nickel" face (face remaining in contact with the plate of nickel-plated brass during the evaporation of the water) to vapours of reactants obtained by evaporation at 60°C. of a 20 percent mixture of dimethyl-sulphoxide and 80 percent of di-isocyanate of toluylene, and then rinsed with benzene and dried at 60°C. for 15 hours.

The exposure to the reactant vapours and also the drying before and after exposure to the reactant vapours were carried out in a desiccator containing $P_2O_5$. The desiccator employed had a volume of 1.6 litres and the crystallizer containing the powdered $P_2O_5$ had a diameter of 7.6 cm. The rinsing with benzene and the transfers of the film were carried out under protection against humidity in a glove box. Under these conditions, the thickness of the reticulated layer, determined after dissolving the non-reticulated portion in hot water, was 1.1 microns.

The film of 6 microns in thickness, deposited on a porous support (Millipore AAWP) having a pore diameter of about 0.8 micron so that the reticulated face is in contact with the support, was tested directly without thermal treatment. By hyper-filtration, under a pressure of 100 bars, of a brine containing 3.5 percent of Nacl prepared from distilled water, there were obtained the results indicated in Table 1 below. At the end of the operation, the thickness of the film had practically not varied.

TABLE 1

Inverse osmosis: pressure ~ 100 bars
3.5% solution of NaCl
Thickness of the reticulated layer: 1.1 μ
Porous support: Millipore AA (Pore diameter 0.8 micron)
Thermal treatment: None.

| Duration of test Hours | Flow-rate of water l/sq.m. per day | Rejection of NaCl % |
|---|---|---|
| 5 | 270 | 79.7 |
| 6.5 | 266 | 82.0 |
| 31 | 250 | 84.9 |
| 55 | 250 | 86.9 |
| 75 | 225 | 88.0 |

NOTE — The water flow-rate is expressed in litres per square metre and per day.

EXAMPLE 2

A film of polyvinyl alcohol of 5 microns in thickness (dry film) was prepared from an 8 percent aqueous solution by weight of Rhodoviol 25/100 M (copolymer of polyvinyl alcohol and vinyl acetate containing 8.5 percent of acetate, manufactured by Rhone Poulenc) following the same method as for the film of Example 1. The film, stretched on a glass support and dried for 1 hour at 80°C., was exposed for 20 hours by its "nickel" face to vapours of reactants obtained by evaporation at 60°C. of a mixture containing 50 percent of dimethyl-sulphoxide and 50 percent of diisocyanate of toluylene, and then rinsed with benzene and dried at 60°C. for 15 hours.

The exposure to the reactant vapours, and also the drying before and after exposure to the reactant vapours were carried out in a desiccator containing $P_2O_5$. The rinsing with benzene and the transfers of the film were carried out in the ambient air. The thickness of the reticulated layer was 4.9 microns.

The film was tested directly without thermal treatment. The test was carried out under the same conditions as for Example 1. The results are given in Table 2 below. The coefficients of permeability of this film, calculated following the method put forward by LOMSDALE, MERTON and RILEY (J. Appl. Polymer. Sci. 9 1965 — 1341) were compared with those of homogeneous disphragms of cellulose acetate thermally treated in water at 80°C. and not treated. These coefficients of permeability, determined after the diaphragms have remained for more than 300 hours under pressure, are given in Table 3 below.

TABLE 2

Inverse osmosis: Pressure ~ 100 bars
3.5% solution of NaCl
Thickness of the reticulated layer: 4.9 μ
Porous support: Millipore AA (diameter of pores 0.8 micron)
Thermal treatment: None.

| Duration of test Hours | Flow-rate of water l/sq.m. per day | Rejection of NaCl % |
|---|---|---|
| 8 | 22 | 80.6 |
| 80 | 21.5 | 83.7 |
| 104 | 19 | 89.7 |
| 130 | 18 | 93.0 |
| 150 | 18 | 94.7 |
| 175 | 18 | 96.2 |
| 210 | 18.5 | 97.3 |
| 234 | 18.5 | 97.5 |
| 256 | 18 | 97.5 |
| 330 | 18 | 98.0 |

TABLE 3

Coefficients of permeability to water (PW) and to NaCl (PS), determined after 300 hours for a 3.5% solution of NaCl and under a pressure of 100 bars.

| Polymer | PW g/cm/sec. | PS sq.cm/sec. | PW/PS g/cu.cm |
|---|---|---|---|
| Cellulose acetate E - 398 - 3 Not thermally treated | $2.5 \times 10^{-7}$ | $2.8 \times 10^{-9}$ | 90 |
| Cellulose acetate E - 398 - 3 Thermally treated | $1.2 \times 10^{-7}$ | $1.2 \times 10^{-10}$ | 1000 |
| Reticulated polivinyl alcohol Rhodoviol 25/100 M | $1.7 \times 10^{-7}$ | $1.9 \times 10^{-10}$ | 900 |

NOTE

PW is expressed in grams per centimetre and per second (g/cm/sec.)
PS is expressed in square centimetres per second (sq.cm./sec.).

EXAMPLE 3

A film of polyvinyl alcohol of 4.9 microns in thickness (dry film) was prepared under the same conditions as in Example 1. The film, stretched on a glass support and dried for 15 hours at 60°C., was superficially reticulated in the same conditions as for Example 1. The film was then subjected to a thermal treatment by immersion in water at 80°C. for 2 hours. After this treatment, the thickness of the film was reduced to 1.1 microns.

The film of 1.1 microns in thickness, deposited on a porous support (Millipore AAWP) having a pore diameter of 0.8 micron, was tested under a pressure of 100 bars with a 3.5 percent solution of NaCl. At the end of 48 hours, the flow-rate of water was 820 litres and the percentage rejection of NaCl was 50 percent.

EXAMPLE 4

A film of polyvinyl alcohol of 10 microns in thickness (dry film) was prepared under the same conditions as in Example 1. The film stretched on a glass support and dried for 15 hours at 60°C., was superficially reticulated under the same conditions as in Example 1, except that the mixture of reactants was composed of 40 percent of dimethyl-sulphoxide and 60 percent of diisocyanate of toluylene, and then rinsed with benzene and dried for 4 hours at 40°C. Under these conditions, the thickness of the reticulated layer, determined after dissolving the non-reticulated portion in hot water, was 3.2 microns.

The film was tested in direct osmosis after a thermal treatment of 2 hours in water at 85°C. For a 5 percent solution of NaCl, the permeabilities measured are those given in Table 4 below, In this same Table there are shown by way of comparison the permeabilities obtained with diaphragms of cellulose acetate, one of which has been thermally treated by immersion in water at 80°C. for 30 minutes.

EXAMPLE 5

A film of Elvanol 73-125, prepared and reticulated under the same conditions as that of Example 1, was treated thermally in water at 85°C. for 2 hours and tested in direct osmosis with a 10 percent aqueous solution of saccharose. The flow-rates of water and saccharose of this film are compared with those of a film of cellulose acetate of similar thickness in Table 5 which follows.

EXAMPLE 6

A film of polyvinyl alcohol of 21 microns in thickness was prepared from a 7 percent aqueous solution of Elvanol 73-125 by the same method as the film of Example 1. The film, stretched on a glass support and dried at 60° C. for 15 hours and 25°C. for 5 hours, was exposed for 7 hours by its "air" face (the face exposed to the air during the evaporation) to reactant vapours obtained by evaporation at 60°C. of a mixture of 40 percent of dimethyl-sulphoxide and 60 percent of toluylene di-isocyanate, then rinsed with ethyl acetate and dried for 2 hours at 50°C. and for 1 hour at 80°C.

The exposure to the reactant vapours and also the drying before and after the exposure to the reactant vapours were carried out in a desiccator containing $P_2O_5$, which was renewed after each operation. The volume of the desiccator was 1.6 litres and the crystallizer containing the powdered $P_2O_5$ had a diameter of 7.6 cm. The rinsing with ethyl acetate and the transfer of the film were carried out under protection against humidity in a glove box.

The film was tested after having been subjected to a thermal treatment consisting of an immersion for 60 minutes in water at 80°C. After this treatment, the thickness of the insoluble layer was 1.2 microns. This layer was placed on a porous support (Millipore VSWP) having a pore diameter of 0.025 micron, so that its hydrophilous face is in contact with the salt solution. The results obtained under a pressure of 100 bars and for a solution with 3.5 percent of NaCl are indicated in Table 6 below.

EXAMPLE 7

A film of polyvinyl alcohol (Elvanol 73-125) having a thickness of 10 microns was prepared under the same conditions as that of Example 6, except that the Elvanol was put into solution at 100°C. (2 hours at 100°C. with reflux) instead of 80°C. The film, stretched on a glass support and dried at 100°C. for 15 hours was exposed for 4 hours by its "air" face to reactant vapours obtained by evaporation at 60°C. of a mixture of 20 percent of dimethyl-sulphoxide and 80 percent of toluylene di-isocyanate and then rinsed with ethyl acetate and dried for 15 hours at 80°C. The other conditions of treatment were the same as those referred to in Example 6.

The film was tested after having been subjected to a thermal treatment consisting of an immersion of 30 minutes in water at 85°C. The thickness of the insoluble layer was 2 microns. The hydrophilous face of the layer was in contact with the brine during the test. The results obtained under the same conditions as those of the previous Example are shown in Table 7.

EXAMPLE 8

A film of polyvinyl alcohol (Elvanol 73-125) prepared and reticulated under conditions similar to those relative to Example 7, were subjected to a thermal treatment by immersion for 60 minutes in water at 85°C. The thickness of the recticulated layer was 2.4 microns. The test in inverse osmosis was carried out under the same conditions as that of Example 7 and the results are given in Table 8 below.

TABLE 4

Coefficients of permeability to water (PW) and to NaCl (PS) determined at 25°C. in direct osmosis for a 5% solution of NaCl.

| Polymer | Thickness Microns | PW g/cm/sec. | PS sq.cm/sec. | PW/PS |
|---|---|---|---|---|
| Cellulose acetate E-398-3 not thermally treated | 3.27 | $2.60 \times 10^{-7}$ | $1.94 \times 10^{-10}$ | 1340 |
| Cellulose acetate E-398-3 thermally treated | 1.06 | $1.35 \times 10^{-7}$ | $4.00 \times 10^{-11}$ | 3375 |
| Elvanol 73-125 reticulated and thermally treated | 3.15 | $2.60 \times 10^{-7}$ | $6.76 \times 10^{-11}$ | 3950 |

TABLE 5

Flow-rates of water (DW) and of saccharose (DSA) measured at 25°C. in direct osmosis for a 10% solution of saccharose.

| Polymer | Thickness Microns | DW mg/cm²/hr | DSA mg/cm²/hr | DW/DSA |
|---|---|---|---|---|
| Cellulose acetate E-398-3 | 1.15 | 36.1 | 0.0053 | 6807 |
| Elvanol 73-125 reticulated | 1.0 | 122.7 | 0.0135 | 9091 |

TABLE 6

Experimental conditions
Pressure: 100 bars; pump output: 13.8 l/hr
Concentration of NaCl in the brine: 3.5%
Temperature of the brine: 28°C.
Thickness of the reticulated layer: 1.2 $\mu$
Porous support: Millipore VSWP (pore diameter 0.025 micron)
Thermal treatment: 60 minutes in water at 80°C.

| Time elapsed since the application of pressure hours | Water flow-rate l/m²/day | NaCl rejection % |
|---|---|---|
| 0.8 | 314 | 92.2 |
| 2.4 | 333.4 | 93.5 |
| 3.7 | 335 | 94.0 |
| Pump stopped for 14 hours | | |
| 21.8 | 325.1 | 95.1 |
| 23.9 | 328.2 | 95.3 |
| Pump stopped for 14 hours | | |
| 46.8 | 323.7 | 95.5 |
| Pump stopped for 14 hours | | |
| 70.7 | 320 | 95.6 |
| Pump stopped for 14 hours | | |
| 94.8 | 315.7 | 95.7 |
| Pump stopped for 62 hours | | |
| 166.9 | 276.6 | 95.8 |
| Pump stopped for 14 hours | | |
| 186.2 | 263.4 | 96.0 |

TABLE 7

Experimental conditions
Pressure: 100 bars; pump output: 13.8 l/hr
Concentration of NaCl in the brine: 3.5%
Temperature of the brine: 28°C.
Thickness of the reticulated layer: 2μ
Porous support: Millipore VSWP
Thermal treatment: 30 minutes at 85°C.

| Time elapsed since the application of pressure hours | Water flow-rate l/m²/day | NaCl rejection % |
|---|---|---|
| 1.25 | 355 | 96.8 |
| 4.5 | 335 | 98.5 |
| 7.0 | 333 | 98.7 |

TABLE 8

Experimental conditions
Pressure: 100 bars; pump output: 13.8 l/hour
Concentration of NaCl in the brine: 3.6%
Temperature of the brine: 28°C.
Thickness of the reticulated layer: 2.4 μ
Porous support: Millipore VSWP
Thermal treatment: 60 minutes in water at 85°C.

| Time elapsed since the application of pressure hours | Water flow-rate l/m²/day | NaCl rejection % |
|---|---|---|
| 1.2 | 136 | 98.9 |
| 5 | 134.7 | 99.0 |
| 7 | 134.9 | 99.0 |
| Pump stopped for 14 hours | | |
| 29 | 129.1 | 99.1 |
| 31.2 | 130.4 | 99.1 |
| Pump stopped for 14 hours | | |
| 53.2 | 126.8 | 99.2 |
| Pump stopped for 14 hours | | |
| 77.2 | 121.9 | 99.2 |
| 79.5 | 122.7 | 99.2 |
| Pump stopped for 14 hours | | |
| 101 | 119.2 | 99.2 |

EXAMPLE 9

A film of polyvinyl alcohol (Elvanol 73-125) of 11 microns in thickness, prepared under the same conditions as that of Example 6, was stretched on a glass support and then dried at 100°C. for 24 hours before being exposed for 10 hours by its "nickel" face to reactant vapours obtained by evaporation at 60°C. of a mixture of 20 percent of dimethyl-sulphoxide and 80 percent of toluylene di-isocyanate. At the emd of the treatment, the film was rinsed with ethyl acetate and dried for 5 hours at 50°C. The other conditions of the treatment were the same as those referred to in Example 6.

This film was immersed for 30 minutes in water brought up to 85°C. After this treatment, the thickness of the imsoluble layer was 1 micron. This layer was deposited on a porous support (Millipore VSWP) and then subjected to the same test of inverse osmosis as the layer of Example 6. The results are given in Table 9 which follows.

TABLE 9

Experimental conditions
Pressure: 100 bars; output of pump: 13.8 l/hour
Concentration of NaCl in the brine: 3.5%
Temperature of the brine: 28°C.
Thickness of the reticulated layer: 1.0 μ
Porous support: Millipore VSWP
Thermal treatment: 30 minutes in water at 85°C.

| Time elapsed since the application of pressure hours | Water flow-rate l/m²/day | NaCl rejection % |
|---|---|---|
| 2 | 317 | 97.2 |
| 5.2 | 311 | 97.6 |
| Pump stopped for 14 hours | | |
| 27 | 297.6 | 98.1 |
| 30 | 297.7 | 98.3 |
| Pump stopped for 14 hours | | |
| 51 | 290.7 | 98.2 |
| 53.5 | 297.1 | 98.3 |
| Pump stopped for 14 hours | | |
| 75 | 285 | 98.3 |
| 77 | 287 | 98.3 |
| Pump stopped for 14 hours | | |
| 98 | 284 | 98.3 |
| 100 | 275 | 98.4 |

EXAMPLE 10

A film of polyvinyl alcohol having a thickness of 20 microns was prepared from a solution of 70 percent dimethyl-sulphoxide of Elvanol 73-125 by pouring the solution over a plate of nickel-plated brass and by evaporation of the solvent under partial vacuum in a stove brought up to 60°C. The film, stretched over a glass support and dried at 100°C. for 20 hours was exposed for 7 hours by its "nickel" face to reactant vapours obtained by evaporation at 50°C. of a mixture of 20 percent of dimethyl-sulphoxide and 80 percent of toluylene di-isocyanate, and then rinsed with ethyl acetate and dried for 2 hours at 50°C. and for 5 hours at 80°C. The subsequent operation was identical to that described in Example 6. The film was subjected to a thermal treatment consisting of an immersion for 2 hours in water at 40°C. followed by immersion for 1 hour in water at 85°C. After this treatment, the thickness of the insoluble layer was 0.7 micron. The results of the test in inverse osmosis, carried out under the same conditions as those of the preceding examples are given in Table 10.

EXAMPLE 11

A film of polyvinyl alcohol (Elvanol 73-125) was prepared under the same conditions as that of Example 10. The film, stretched on a glass support and dried at 60°C. for 20 hours, was exposed for 7 hours by its "nickel" face to reactant vapours obtained by evaporation at 60°C. of a mixture of 20 percent of dimethyl-sulphoxide and 80 percent of toluylene-di-isocyanate. The rest of the operation was identical with that described in Example 10.

The film was subjected to a thermal treatment by immersion for 2 hours in water at 40°C., followed by immersion for 60 minutes in water at 85°C. The thickness of the reticulated layer was 1.5 microns. The results of the test in inverse osmosis carried out under the same conditions as those of the preceding examples are given in Table 11 below.

It is found from the previous examples that the water flow-rate falls after each stoppage of the circulation of the brine, especially when the diaphragm is maintained under pressure. This reduction increases directly with the duration of the stoppage. By eliminating these stoppages, no reduction of the water flow-rate should be observed in practice. The examples which follow are concerned with tests carried out with a continuous circulation of the brine. These tests prove that the compacting of the diaphragm is small.

EXAMPLE 12

A film of polyvinyl alcohol (Elvanol 73-125), prepared under the same conditions as in Example 1, was stretched on a glass support and dried for 15 hours at 60°C. and the reticulated superficially under the same conditions as in Example 1. The final drying was carried out at 50°C. for 5 hours.

The film was tested after having been subjected to a thermal treatment consisting of an immersion for 30 minutes in water at 85°C. After this treatment, the thickness of the insoluble layer was 1.5 microns.

The results of the test in inverse osmosis, carried out under the same conditions as those of the previous examples, are indicated in Table 12A. At the end of 40 days' operation at 100 bars, the pressure was increased to 120 bars; the results obtained are given in Table 12B.

TABLE 10

Experimental conditions
Pressure: 100 bars; output of pump: 13.8 l/hour
Concentration of NaCl in the brine: 3.5%
Temperature of the brine: 28°C.
Thickness of the reticulated layer: 0.7 μ
Porous support: Millipore VSWP
Thermal treatment: 2 hours in water at 40°C. and 1 hour in water at 85°C.

| Time elapsed since the application of pressure hours | Water flow-rate l/m²/day | NaCl rejection % |
|---|---|---|
| 0.5 | 545 | 91.2 |
| 1.5 | 542.3 | 92.1 |
| 4.5 | 527.2 | 93.2 |
| 7.5 | 511 | 93.5 |
| Pump stopped for 15 hours | | |
| 26 | 470 | 94.0 |
| 29.5 | 463 | 94.5 |
| 31 | 458 | 94.6 |

TABLE 11

Experimental conditions
Pressure: 100 bars; pump output 13.8 l/hour
Concentration of NaCl in the brine: 3.6%
Temperature of the brine: 28°C.
Thickness of the reticulated layer: 1.5 μ
Porous support: Millipore VSWP
Thermal treatment: 2 hours in water at 40°C. and 1 hour in water at 85°C.

| Time elapsed since the application of pressure hours | Water flow-rate l/m²/day | NaCl rejection % |
|---|---|---|
| 0.9 | 177.4 | 97.3 |
| 3.5 | 180.0 | 98.1 |
| Pump stopped for 14 hours | | |
| 24.0 | 170.2 | 98.3 |
| 26.5 | 170.9 | 98.4 |
| Pump stopped for 14 hours | | |
| 48.5 | 166.7 | 98.3 |
| 51.1 | 167.1 | 98.4 |
| Pump stopped for 14 hours | | |
| 74.3 | 158.5 | 98.4 |
| Pump stopped for 14 hours | | |
| 98.5 | 151.5 | 98.4 |

TABLE 12A

RESULTS RELATING TO EXAMPLE 12

Experimental conditions
Pressure: 100 bars; output of pump: 13.8 l/hour
Concentration of NaCl in the brine: 3.5%
Temperature of the brine: 28°C.
Porous support: Millipore VSWP
Thermal treatment: 30 minutes at 85°C.
Thickness of the reticulated layer: 1.5 μ

| Time elapsed since the application of pressure | | Water flow-rate l/m²/day | NaCl rejection % |
|---|---|---|---|
| 1.2 | hours | 225.7 | 98.0 |
| 7 | do. | 212.5 | 98.5 |
| 1 | day | 216 | 98.6 |
| 2 | days | 217 | 98.6 |
| 3 | do. | 217 | 98.5 |
| 4 | do. | 215 | 98.5 |
| 5 | do. | 229 | 98.4 |
| 6 | do. | 225 | 98.4 |
| 7 | do. | 212 | 98.5 |
| 8 | do. | 212 | 98.5 |
| 9 | do. | 211 | 98.4 |
| 10 | do. | 211 | 98.4 |
| 20 | do. | 210 | 98.4 |
| 30 | do. | 215 | 98.5 |
| 40 | do. | 211 | 98.4 |

TABLE 12B

RESULTS RELATING TO EXAMPLE 12

Experimental conditions
Pressure: 120 bars; Pump output: 13.8 l/hour
Concentration of NaCl in the brine: 3.5%
Temperature of the brine: 28°C.

| Time elapsed since the application of pressure Days | Water flow-rate l/m²/day | NaCl rejection % |
|---|---|---|
| 43 | 282 | 98.6 |
| 45 | 280 | 98.7 |
| 50 | 282 | 98.7 |
| 54 | 281 | 98.7 |

EXAMPLE 13

A film of polyvinyl alcohol (Elvanol 73-125) prepared and reticulated on the surface under conditions identical with those of Example 10, was rinsed with ethyl acetate and dried for 15 hours at 80°C. in the presence of $P_2O_5$.

The film was tested after having been subjected to a thermal treatment consisting of an immersion for 1 hour in water at 40°C., followed by an immersion for 30 minutes in water at 80°C. The thickness of the insoluble layer was 1.9 microns. The results of the test in inverse osmosis carried out under the same conditions as the tests relating to the previous examples are given in Table 13.

TABLE 13

RESULTS RELATING TO EXAMPLE 13

Experimental conditions
Pressure: 100 bars; Pump output: 13.8 l/hour
Concentration of NaCl in the brine: 3.5%
Temperature of the brine: 28°C.
Porous support: Millipore VSWP
Thermal treatment: 1 hour in water at 40°C. and 20 minutes in water at 85°C.
Thickness of the reticulated layer: 1.9 μ

| Time elapsed since the application of pressure Days | Water flow-rate l/m²/day | NaCl rejection % |
|---|---|---|
| 0.2 | 480 | 95.0 |
| 5 | 390 | 96.1 |
| 10 | 380 | 96.7 |
| 20 | 372 | 97.0 |
| 30 | 372 | 97.7 |
| 40 | 368 | 97.8 |
| 50 | 368 | 97.8 |
| 60 | 362 | 97.8 |
| 70 | 352 | 97.9 |
| 80 | 355 | 97.9 |
| 100 | 350 | 97.9 |
| 115 | 352 | 97.9 |

EXAMPLE 14

A film of polyvinyl alcohol of 20 microns in thickness was prepared from a 7 percent solution of Elvanol 73-125 in the DMSO. This solution contained 0.05 percent with respect to the weight of polymer of dibutyletain diacetate. The film, stretched over a glass support and dried at 100°C. for 15 hours, was exposed for 6 hours by its "nickel" face to reactant vapours obtained by evaporation at 60°C. of a mixture of 10 percent of dimethyl-sulphoxide and 90 percent of toluylene diisocyanate. The rest of the operation was identical with that described in Example 13.

The film was first conditioned for 1 hour in water at ambient temperature before being immersed for 1 hour in water at 40°C. and for 30 minutes in water at 85°C.

The insoluble layer was deposited on a porous support (Millipore DSWP) in such manner that its hydrophilous face is in contact with the brine. The diaphragm was dried for several days before its test in inverse osmosis. The results of the test are indicated in Table 14A. The results of the test carried out at different pressures are indicated in Table 14B. After this series of tests, the diaphragm was removed from the apparatus and kept in a dry state for 3 days, and then reassembled on the apparatus. The results obtained under the same conditions as before are given in Table 14C.

The main results of all the tests carried out on the diaphragms of reticulated polyvinyl alcohol have been recapitulated in Table 15.

The direct osmosis measurements carried out on films of polyvinyl-pyrrolidone reticulated by diisocyanate of diphenyl-methane have shown that this polymer has coefficients of permeability to water and to NaCl which are of the same order of magnitude as those of cellulose acetate treated thermally and of polyvinyl alcohol treated according to the method described above ($1.4$ to $1.7 \times 10^{-7}$ g/cm/sec. for water and $0.9$ to $3 \times 10^{-11}$ cm²/sec. for NaCl.

On the other hand, the coefficient of permeability to urea of this polymer is from 6 to 10 times lower than those of the polymers mentioned. It therefore appeared to us to be advantageous to utilize the method described above for the superficial reticulation of a film of polyvinyl-pyrrolidone. The example which we give below relates to one of the first tests carried out with this polymer. Although the results given of this example are very modest in respect of the percentage rejection of NaCl, they show nevertheless that the method described above may be extended to polymers other than polyvinyl alcohol.

EXAMPLE 15

A film of polyvinyl-pyrrolidone was prepared from a 15 percent solution of Luviscol K 90* and a 0.6 percent solution of diamino-4-4-diphenyl-methane in dimethylsulphoxide by pouring the solution over a glass plate and by evaporation of the solvent under partial vacuum in a stove brought up to 80°C. The film was dried for 15 hours in the presence of $P_2O_5$ and at ambient temperature, and then exposed for 6 hours by its "air" face to reactant vapours obtained by evaporation at 60°C. of a mixture of 20 percent of dimethyl-sulphoxide and 60 percent of toluylene di-isocyanate. The film was not rinsed after this operation but was dried directly for 8 hours at 80°C. and in the presence of $P_2O_5$.

(*Luviscol K 90 is a polyvinyl-pyrrolidone in which the K-wert is equal to 90 (the K-wert being a magnitude characteristic of the intrinsic viscosity of the polymer).)

The film was subjected to a thermal treatment consisting of an immersion for 1 hour in water at 40°C., followed by an immersion for 30 minutes in water at 85°C. After this treatment, the thickness of the insoluble layer was 13 microns. This layer was deposited on a porous support (Millipore SVWP) in such manner that its hydrophilous face is in contact with the brine. The test in inverse osmosis carried out at 28°C. under the usual conditions gave the following results: flow-rate — 520 l/m²/day, percentage rejection of NaCl — 43%.

TABLE 14A

RESULTS RELATING TO EXAMPLE 14

Experimental conditions
Pressure: 100 bars; output of pump: 13.8 l/hour
Concentration of NaCl in the brine: 3.5%
Temperature of the brine: 28°C.
Porous support: Millipore VSWP
Thermal treatment: 1 hour in water at 40°C. and 30 minutes in water at 85°C.

| Time elapsed since the application of pressure Days | Water flow-rate l/m²/day | NaCl rejection % |
|---|---|---|
| 1 | 492 | 97.2 |
| 2 | 500 | 98.0 |
| 3 | 505 | 98.0 |
| 4 | 498 | 98.1 |
| 5 | 506 | 98.1 |
| 6 | 508 | 98.2 |
| 9 | 494 | 98.2 |
| 12 | 506 | 98.2 |
| 13 | 500 | 98.2 |

TABLE 14B

Variation of the flow-rate and the percentage rejection of salt in dependence on the pressure. Concentration of NaCl in the brine: 3.5%.

| Pressure Bars | Water flow-rate at 28°C. $l/m^2/day$ | Rejection % |
|---|---|---|
| 120 | 650 | 98.5 |
| 100 | 500 | 98.2 |
| 80 | 360 | 97.8 |
| 60 | 220 | 96.8 |

Note — These results were obtained after a preliminary test of 10 days at 100 bars.

TABLE 14C

Results obtained after dry storage for 3 days of the diaphragm referred to in the Example 14. Experimental conditions identical with those indicated in Table 14A.

| Time elapsed since the application of pressure Days | Water flow-rate $l/m^2/day$ | NaCl rejection % |
|---|---|---|
| 1 | 448 | 97.9 |
| 2 | 447 | 98.0 |
| 3 | 450 | 98.0 |
| 4 | 444 | 98.1 |
| 7 | 447 | 98.1 |
| 8 | 445 | 98.2 |

of the reagents of the reticulating solution, and dissolving the non-reticulated remainder of the film producing polymer in hot water.

2. A process as claimed in claim 1, in which the recticulation agent is selected from such agents having a high speed of reaction and a high diffusion rate into said film.

3. A process according to claim 1, wherein the film producing polymer has groupings with mobile hydrogen in a number sufficient to form compounds being insoluble in water after reticulation by a dissocyanate.

4. A process according to claim 1, wherein the film producing polymer has a substantially high molecular weight.

5. A process according to claim 4, wherein the average molecular weight of the film producing polymer is such that a 4 percent aqueous solution has a viscosity of 50 to 150 centipose at 20°C.

6. A process according to claim 1, wherein the film producing polymer is selected from the group consisting of the polyvinyl alcohols, polyethylene glycol, the imine polyethylenes, and polyvinyl pyrrolidone.

7. A process according to claim 6, wherein the polyvinyl alcohol has a viscosity of approximately 5000 centipoise.

8. A process according to claim 1, wherein the solution containing the film producing polymer includes a reticulation catalyst.

TABLE 15

Recapitulation of results relating to tests carried out in inverse osmosis at 28° C, at a pressure of 100 bars and for a brine with 3.5% of NaCl, on diaphragms of polyvinyl alcohol.

| Example No. | Thickness of reticulated layer μ | Support employed | Polymer solvent | *Conditions of thermal treatment | Water flow-rate $l/m^2/day$ | NaCl rejection % | Time elapsed Hours** |
|---|---|---|---|---|---|---|---|
| 1 | 1.1 | Millipore AAWP | Elvanol 73–125 water | No treatment | 225 | 88.0 | 75 |
| 2 | 4.9 | do. | Rhodoviol 25/100Mwater | do. | 18 | 98.0 | 330 |
| 3 | 1.1 | do. | Elvanol 73–125 water | 2 hours at 80°C. | 820 | 50.0 | 48 |
| 6 | 1.2 | Millipore VSWP | do. | 1 hour at 80°C. | 316 | 95.7 | 95 |
| 7 | 2.0 | do. | do. | 30 min. at 85°C. | 333 | 98.7 | 7 |
| 8 | 2.4 | do. | do. | 1 hour at 85°C. | 123 | 99.2 | 79.5 |
| 9 | 1.0 | do. | do. | 30 min. at 85°C. | 275 | 98.4 | 100 |
| 10 | 0.7 | do. | Elvanol 73–125 DMSO | 2 hours at 40°C. + 1 hr at 85°C. | 454 | 94.6 | 31 |
| 11 | 1.5 | do. | do. | do. | 158 | 98.4 | 74 |
| 12 | 1.5 | do. | Elvanol 73–125 water | 30 min. at 85°C. | 212 | 98.5 | 7 |
| 13 | 1.9 | do. | Elvanol 73–125 DMSO | 1 hour at 40°C. 30 min. at 85°C. | 352 | 97.9 | 115 days |
| 14 | do. | do. | do. | do. | 500 | 98.2 | 13 days |

* The thermal treatment consists of immersion of the diaphragm in hot water at the temperature and for the time indicated in the column.
** Time elapsed between the moment of applying pressure to the diaphragm and that of the sample extraction.

What we claim is:

1. A process for manufacturing a membrane for inverse osmosis including at least one layer of a film producing reticulated polymer having a degree of reticulation which varies progressively from one face of the layer to the other comprising, preparing a film by drying a thin layer of a solution containing a film producing polymer; placing one face of the film in contact with reticulating reactants present in a recticulating solution to thereby effect reticulation of a portion of the film; removing the reticulated film from the presence of the reticulating solution; rinsing the film in a solvent

9. A process according to claim 1, wherein the reticulating solution includes one of a solvent and swelling agent of the film producing polymer.

10. A process according to claim 1, wherein the reticulating solution includes a reticulation catalyst.

11. A process according to claim 1, wherein the reticulating solution includes as a reticulation agent a diisocyanate, or tolylene dissocyanate.

12. A process according to claim 1, further including hot-drying with rapid evaporation of the solvent after the reticulated film has been removed from the presence of the reticulation solution.

13. A process according to claim 1, wherein the rinsing solvent is benzene or ethyl acetate.

14. A process according to claim 1, further comprising heating said film producing polymer in water between 30°C and 100°C prior to dissolving said non-reticulated remainder.

15. A process according to claim 1, further comprising fixing the reticulated layer on a porous support prior to dissolving said non-reticulated remainder.

16. A process according to claim 1, further comprising fixing the reticulated layer on a porous support after dissolving said non-reticulated remainder.

17. A process according to claim 1, further comprising fixing the reticulated layer on a permeable support prior to dissolving said non-reticulated remainder.

18. A process according to claim 1, further comprising fixing the reticulated layer on a permeable support after dissolving said non-reticulated remainder.

19. A process according to claim 1, wherein the preparation of the polymeric film from the solution of the film producing polymer comprises rapid evaporation of the solvent from the solution to produce a film having an assymetrical structure, said film being more dense in the vicinity of the surface from which the evaporation takes place.

20. A process according to claim 19, wherein the more dense face of the polymeric film is subjected to the vapors of the reticulation solution comprising diisocyanate in a swelling agent for said film.

21 A process according to claim 19, wherein the reticulation takes place under controlled humidity.

22. A process according to claim 1, wherein said film producing polymer is soluble in hot water in the non-reticulated condition.

23. A process for manufacturing a membrane for inverse osmosis including at least one layer of a film producing reticulated polymer having a degree of reticulation which varies progressively from one face of the layer to the other comprising preparing a film by drying a thin layer of a solution containing a film producing polymer;

placing one face of the film in contact with reticulating reactants present in a reticulating solution to thereby effect reticulation of a portion of the film;

removing the reticulated film from the presence of the reticulating solution;

rinsing the film in a solvent of the reagents of the reticulating solution; and dissolving the non-reticulated remainder of the film producing polymer in a solvent of the polymer in the non-reticulated condition.

24. A membrane for inverse osmosis made by the process of claim 23 comprising at least one layer of a reticulated polymer film having a degree of reticulation varying progressively from one face of the layer to the other.

25. A membrane according to claim 24, wherein said layer is a superficial thin layer and said membrane further comprises a thicker and more porous sub-layer, said sub-layer supporting said superficial thin layer.

26. A membrane according to claim 24 wherein the layer is deposited on a porous support.

27. A membrane according to claim 26, wherein the face having the higher degree of recticulation contacts the support.

28. A membrane according to claim 26, wherein the support is a polymer wettable by water.

29. A membrane according to claim 24, wherein the layer is deposited on a permeable support.

30. A membrane according to claim 24, wherein the film producing reticulated polymer is selected from the group consisting of polyvinyl alcohol, polyvinyl alcohol containing a small amount of polyvinyl acetate, polyoxyethylene glycol, polyethylene imine, polyvinylpyrrolidone and a copolymer of polyvinyl alcohol and vinyl acetate.

31. A membrane according to claim 24, wherein the membrane has a rejection coefficient for sea salt of 98 to 99 percent.

32. A membrane according to claim 24, having a thickness of from 0.5 to 10 microns.

33. A membrane according to claim 24, wherein the polymer is polyvinyl alcohol.

34. A membrane according to claim 24, wherein the polymer is polyvinyl pyrrolidone.

35. A membrane according to claim 24, wherein said film is an asymmetrical reticulated layer, with the structure of said film being dense close to said one major face and less dense in the vicinity of said other major face.

* * * * *